(12) United States Patent
Routhier

(10) Patent No.: US 7,360,746 B2
(45) Date of Patent: Apr. 22, 2008

(54) ASYMMETRIC DRIVE PIN

(76) Inventor: Raymond Routhier, 551, boulevard Lamontagne, Sainte-Marie de Beauce (Québec) (CA) G6E 3W4

( * ) Notice: Subject to any disclaimer, the term of this patent is extended or adjusted under 35 U.S.C. 154(b) by 242 days.

(21) Appl. No.: 10/941,907

(22) Filed: Sep. 16, 2004

(65) Prior Publication Data
US 2005/0076602 A1    Apr. 14, 2005

Related U.S. Application Data

(60) Provisional application No. 60/503,494, filed on Sep. 17, 2003.

(51) Int. Cl.
*A47G 29/02* (2006.01)
(52) U.S. Cl. ........................ 248/250; 248/251
(58) Field of Classification Search ................ 248/546, 248/684, 216.1, 216.4, 217.1–217.4, 231.9, 248/250, 497, 498, 67.5, 50, 222.11, 222.13, 248/222.51, 222.52; 411/340, 41, 48, 344, 411/45–47, 60, 62, 398; 280/86.753; D8/380, D8/354, 363, 396
See application file for complete search history.

(56) References Cited

U.S. PATENT DOCUMENTS

| | | | |
|---|---|---|---|
| 4,264,047 A | 4/1981 | Nelson | |
| 4,405,272 A * | 9/1983 | Wollar | 411/41 |
| 4,646,998 A * | 3/1987 | Pate | 248/250 |
| 4,662,808 A * | 5/1987 | Camilleri | 411/340 |
| 4,669,936 A | 6/1987 | Camilleri | |
| 4,722,648 A | 2/1988 | Camilleri | |
| 4,786,225 A * | 11/1988 | Poe et al. | 411/32 |
| 4,828,209 A * | 5/1989 | Niemi | 248/220.42 |
| D310,623 S | 9/1990 | Aranibar | |
| 5,286,151 A * | 2/1994 | Eshraghi | 411/43 |
| 5,286,152 A * | 2/1994 | Anderson | 411/45 |
| 5,290,313 A * | 3/1994 | Heldreth | 623/20.15 |
| 5,387,065 A * | 2/1995 | Sullivan | 411/48 |
| 5,409,336 A * | 4/1995 | Jericevich et al. | 411/41 |
| 5,482,419 A * | 1/1996 | Leistner | 411/442 |
| 5,533,851 A | 7/1996 | Remmers | |
| 5,556,433 A * | 9/1996 | Gabriel et al. | 623/20.36 |
| 6,494,653 B2 | 12/2002 | Remmers | |
| 6,676,349 B1 * | 1/2004 | Mey | 411/80.5 |

FOREIGN PATENT DOCUMENTS

JP          9-25915      *  7/1995

* cited by examiner

*Primary Examiner*—Gwendolyn Baxter
(74) *Attorney, Agent, or Firm*—Ogilvy Renault, LLP

(57) ABSTRACT

The present invention relates to a drive pin having a shank and a head asymmetrically disposed relatively to said shank. It also relates to a wall anchor assembly comprising a wall anchor adapted to be inserted in a wall for firmly maintaining the wall anchor assembly thereon; a passageway along the wall anchor; and a drive pin adapted to be inserted in the passageway and having a head providing, upon rotating the drive pin inserted in the passageway, a variable distance between the periphery of the head and an object mounted proximate thereto.

5 Claims, 5 Drawing Sheets

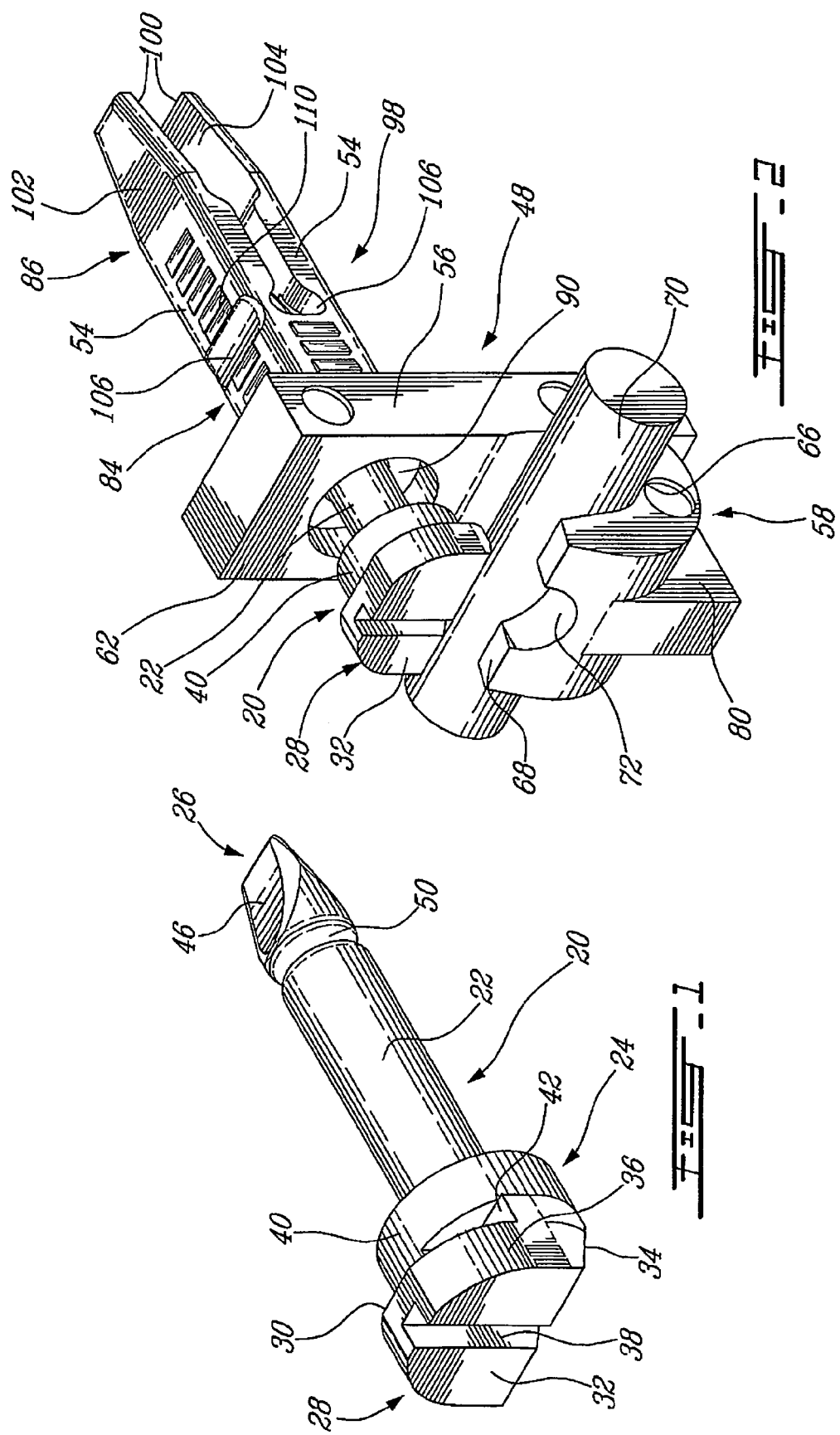

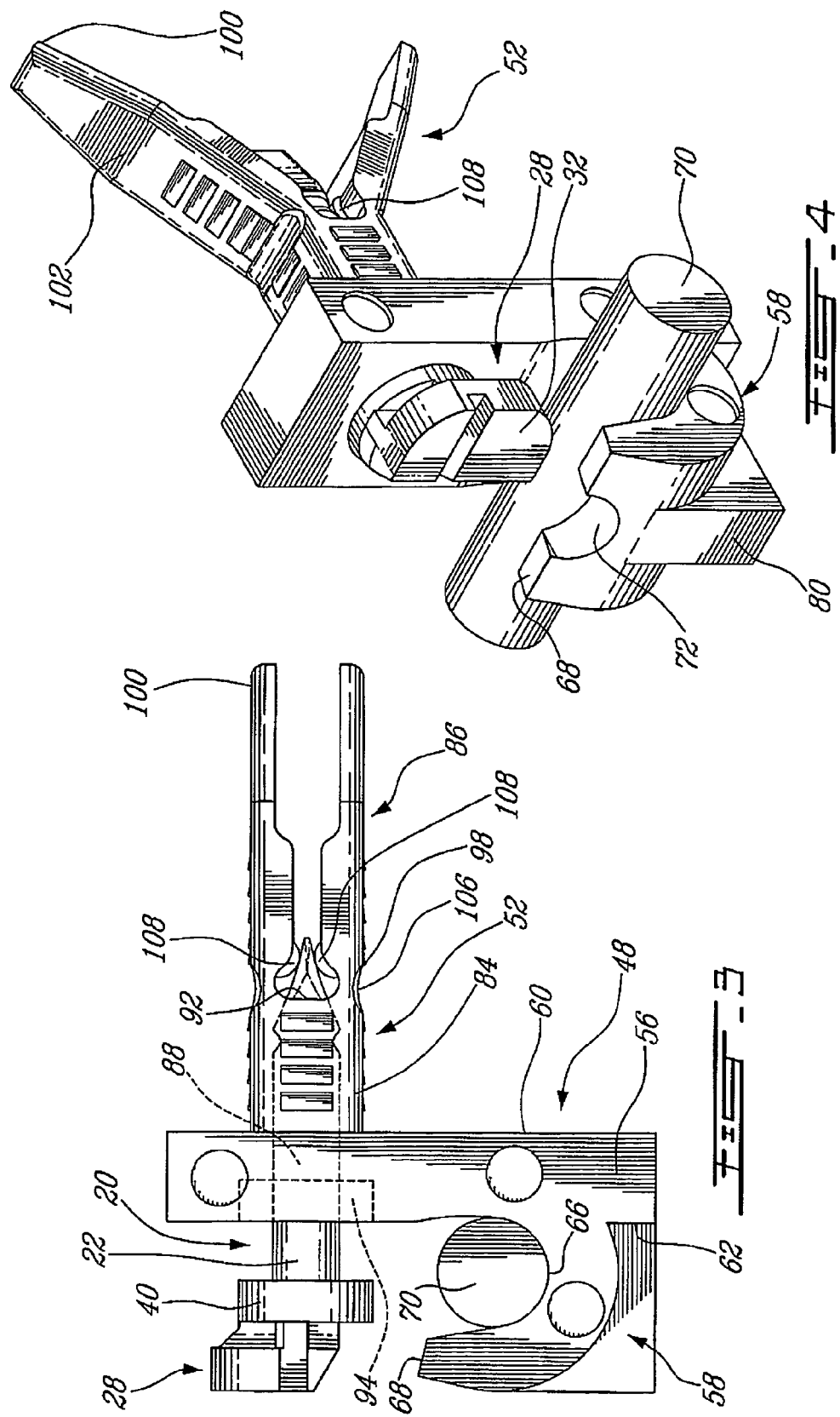

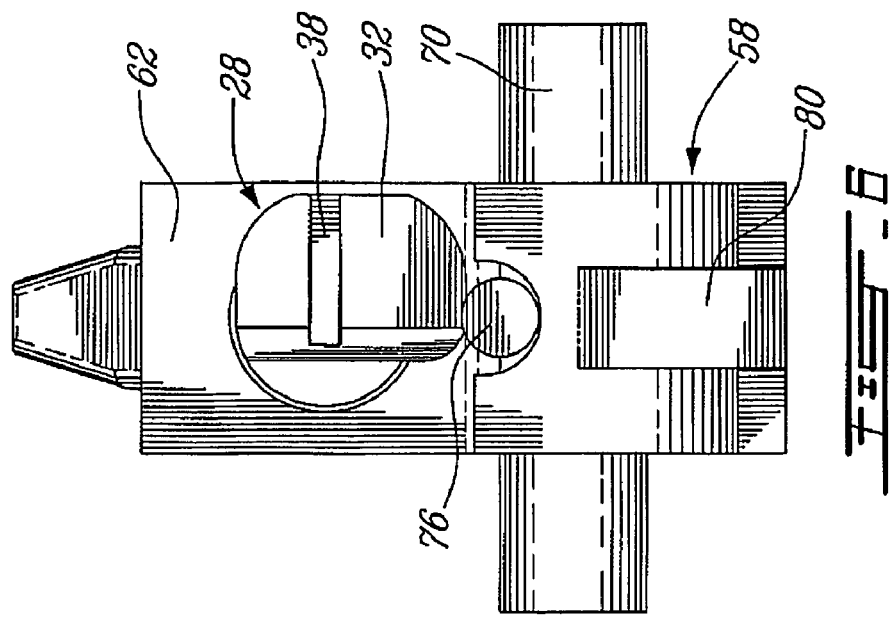
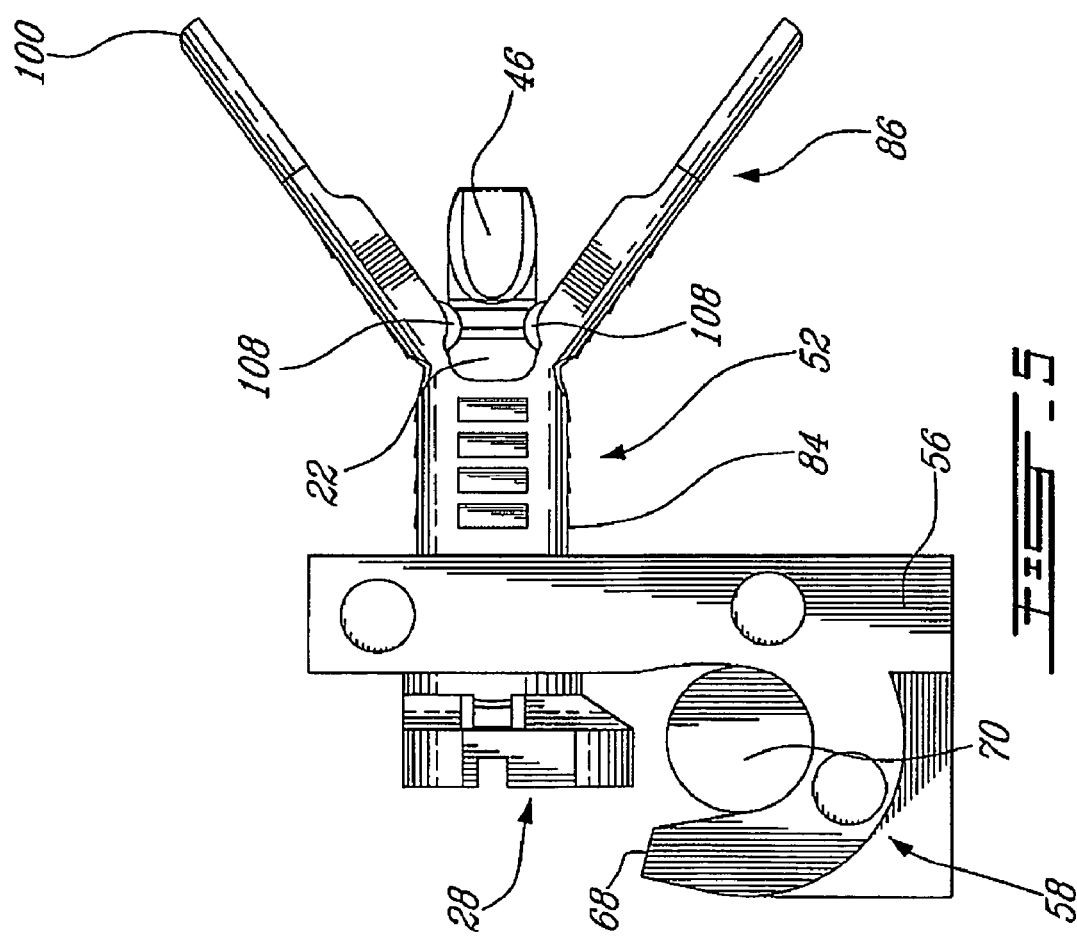

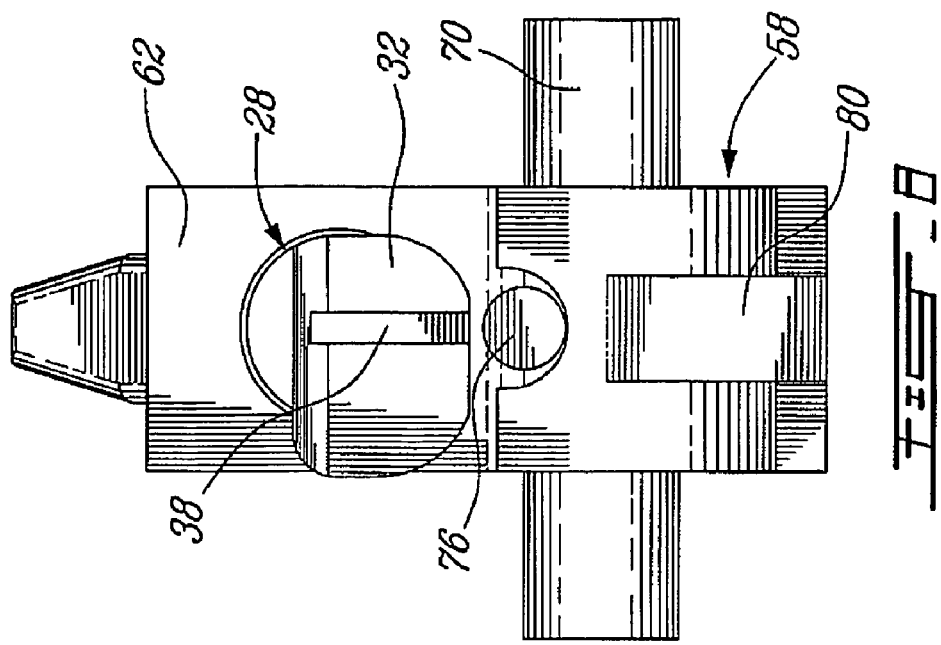
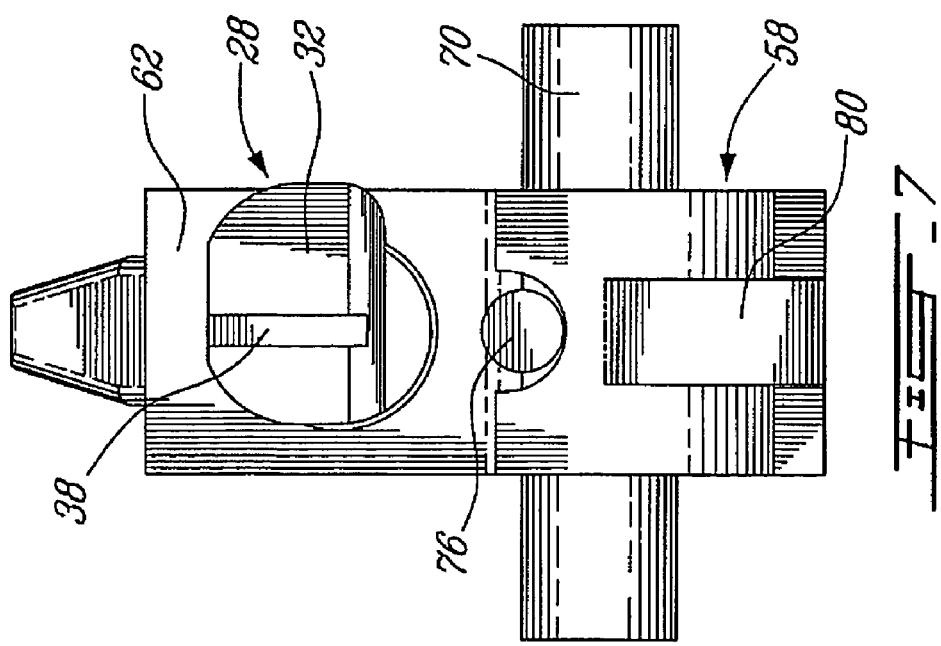

ASYMMETRIC DRIVE PIN

CROSS-REFERENCE TO RELATED APPLICATIONS

This application claims priority of U.S. provisional patent application 60/503,494, filed Sep. 17, 2003, the specification of which is hereby incorporated by reference.

BACKGROUND OF THE INVENTION

1.) Field of the Invention

The present invention relates to a drive pin having a head asymmetrically mounted on its shank and, more particularly, to an asymmetric drive pin used in combination with a wall anchor.

2.) Description of the Prior Art

Back clip assemblies are usually used for mounting shelves on walls and include a body with a wall anchor extending therefrom and a rod engaging hook formed in it. Several back clip models are available on the market and some of them comprise a wall anchor with laterally expandable fingers to increase the anchoring strength. These fingers are expanded against the back side of a wall when a drive pin is inserted through the wall anchor as shown in U.S. Pat. Nos. 4,264,047; 4,669,936; and 4,722,648.

Shelves for wall mounting typically comprise back and front rods extending the length of the shelf, parallel to each other, and regularly spaced parallel cross rods, perpendicular to the back and front rods. The cross rods have a rear and a front ends. The rear and frond ends are respectively mounted on the upper side of the back and front rods. The cross rods are sufficiently close to each other to support articles, even small ones, on them.

For mounting a shelf on a wall, at least two back clips are mounted on the wall, at the same height with respect to the ground. The back rod of the shelf is inserted in the rod engaging hooks of the back clips.

Two major problems occur with this type of fastening device. On one hand, the back rod is often released from the rod engaging hook due to a pressure applied on the shelf. On the other hand, the drive pin is sometimes released from the wall anchor due to a pressure applied on the expandable fingers. To overcome these problems, U.S. Pat. No. 4,669,936 discloses a back clip with a stop member, having a recess in it, and pivotally mounted on the upper part of the clip. Once the back rod of the shelf is inserted in the hook, the stop member is pivoted downwardly and the head of the drive pin is covered by the stop member, inside its recess portion. In this position, the stop member blocks the release of the shelf back rod from the hook and, at the same time, covers the head of the drive pin. However, interference frequently occurs between the stop member and the cross rods since the back clips are often installed without prior consideration for the cross rod location, and the stop member is significantly wide. When interference occurs, the stop member then cannot be pivoted downwardly. U.S. Pat. No. 4,722,648 solved a part of this problem by providing recesses and notches on opposite sides of the stop member. These notches and recesses allow the stop member to clear some cross rods that otherwise would interfere with the stop member. However, this solution requires more steps to be performed by the installer for mounting a shelf and cannot be applied if some cross rods are thicker than others.

SUMMARY OF THE INVENTION

It is a object of the present invention to provide a new wall anchor assembly, having a drive pin, which addresses the above concerns and which can be used in a back clip assembly.

One aspect of the invention provides a drive pin comprising a shank having a trailing end and a leading end; and a head asymmetrically disposed relative to the trailing end of the shank.

Another aspect of the invention provides a wall anchor assembly comprising: a body section having a back face for abutment against a wall and a front face, a wall anchor extending from the back face, a passageway defined along the wall anchor and through the body, the wall anchor being adapted to be inserted in the wall for firmly maintaining said wall anchor assembly thereon, and a support member extending from the front face and transversally spaced from the passageway; and a drive pin adapted to be inserted in said passageway and having a head providing, upon rotating said drive pin in said passageway, a variable distance between the periphery of said head and the support member.

Another aspect of the invention provides a back clip in combination with a drive pin, the back clip comprising: a wall anchor for mounting the back clip to a wall, the wall anchor having a passageway adapted to receive the drive pin therein and a support member for mounting an object to the back clip; and the drive pin having a head providing, upon rotating the drive pin in the passageway, a variable free spacing between the periphery of the head and the support member.

Another aspect of the invention provides a drive pin adapted to be inserted into a wall anchor. The drive pin and the wall anchor comprise at least one groove and at least one protruding member, the at least one groove being adapted to receive at least one protruding member in a mating engagement for firmly maintaining the drive pin in the wall anchor.

A further aspect of the invention provides a wall anchor assembly comprising: an insert defining a passageway therealong and having at least one finger member pivotally mounted; and a drive pin being adapted to provide an outward pivotal movement of the at least one finger member when inserted in the passageway. The insert and the drive bin have at least one female member and at least one male member engaging one another when the drive pin is inserted in the passageway to firmly maintain the drive pin therein.

Another aspect of the invention provides a wall anchor adapted to be inserted into a wall in combination with a drive pin having a shank. The wall anchor comprises a passageway therealong for inserting the drive pin therein; and at least one finger member pivoting outwardly when the drive pin is inserted in the passageway. The wall anchor and the drive pin include at least one groove and at least one protruding member engaging one another when the drive pin is inserted in the passageway to firmly maintain the drive pin therein.

Another aspect of the invention provides a shelf support assembly comprising: a back clip having a body with a back face and a front face, an upper portion and a lower portion, a wall anchor extending from the back face, in the upper portion, and a shelf-receiving hook extending from the front face, in the lower portion, and a passageway traversing the body and the wall anchor; and a drive pin having a shank for insertion into the passageway, and a head having an off centered portion relative to the shank, the drive pin being rotatable in the passageway for rotating the off-centered portion from a shelf-engagement orientation, away from the hook, to a shelf-locking orientation, towards the hook, when a portion of the shelf is engaged in the hook.

BRIEF DESCRIPTION OF THE DRAWINGS

Further features and advantages of the present invention will become apparent from the following detailed description, taken in combination with the appended drawings, in which:

FIG. 1 is a perspective view of a drive pin in accordance with an embodiment of the present invention;

FIG. 2 is a perspective view of a back clip assembly in accordance with an embodiment of the present invention, wherein the drive pin is partially inserted in the passageway;

FIG. 3 is a side view of the back clip assembly of the embodiment shown on FIG. 2, wherein the drive pin is partially inserted in the passageway;

FIG. 4 is a perspective view of the back clip assembly of the embodiment shown on FIGS. 2 and 3, wherein the shank of the drive pin is completely inserted;

FIG. 5 is a side view of the back clip assembly of the embodiment shown on FIGS. 2 and 4, wherein the shank of the drive pin is completely inserted;

FIG. 6 is a front view of the back clip assembly of the embodiment shown on FIGS. 2-5, wherein the head of the drive pin is in a first position;

FIG. 7 is a front view of the back clip assembly of the embodiment shown on FIGS. 2-5, wherein the head of the drive pin is in a second position;

FIG. 8 is a front view of the back clip assembly of the embodiment shown on FIGS. 2-5, wherein the head of the drive pin is in a third position;

It will be noted that throughout the appended drawings, like features are identified by like reference numerals.

DETAILED DESCRIPTION OF THE PREFERRED EMBODIMENT

Figure 10:
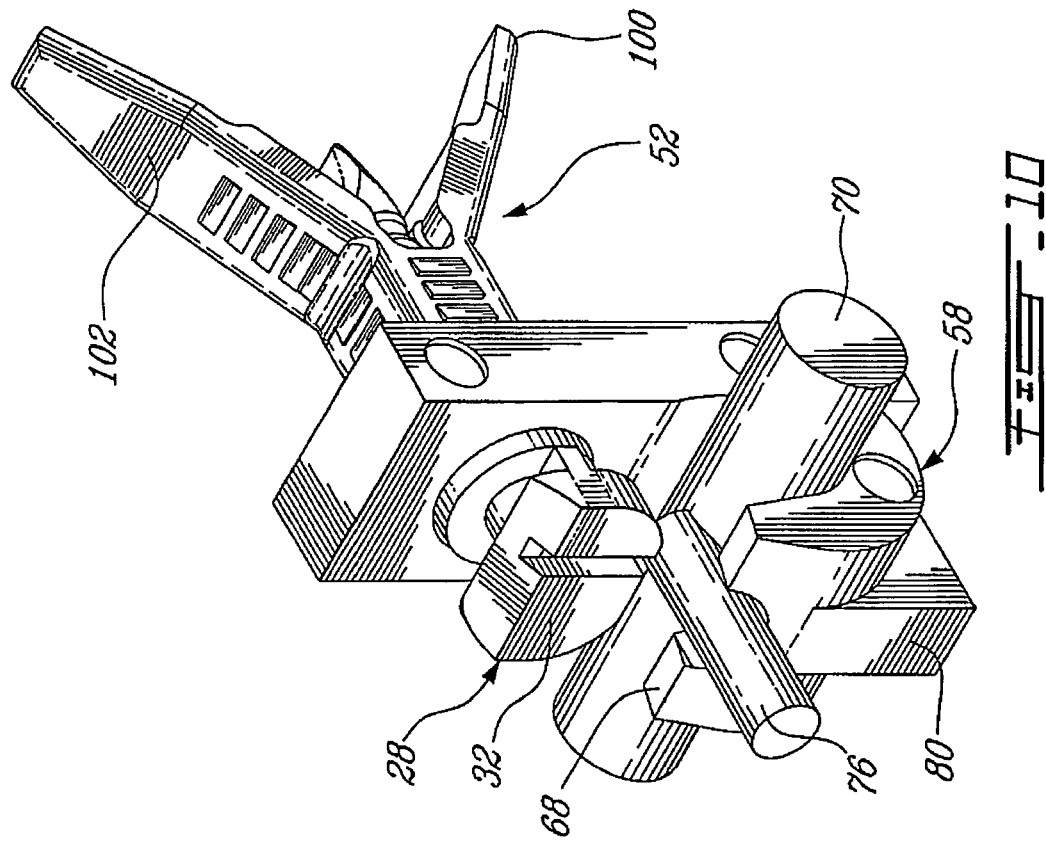
FIG. 10 is a perspective view of the back clip assembly of the embodiment shown on FIGS. 2-5, wherein a cross rod of a shelf abuts the back clip assembly and the head of the drive pin is in the third position.

Referring to FIG. 1, it will be seen that an asymmetric drive pin 20 according to the invention has a shank 22, with a trailing end 24 and a leading end 26, and a head 28 with an inner face 30 and an outer face 32 opposed to the inner face 30. The inner face 30 of the head 28 is asymmetrically mounted to the trailing end 24 of the shank 22. As shown on FIG. 1, the periphery of the head 28 has a semi-circular shape with a straight edge 34 and a semi-circular edge 36. The straight edge 34 is mounted contiguous to the shank 22. Even if a semi-circular shaped head 28 is shown in the embodiment of FIG. 1, one skilled in the art will appreciate that the head 28 can have any predetermined shape provided it is not symmetrically mounted to the shank 22 in all directions. For example, a circular shaped head (not shown) can be asymmetrically mounted to the shank.

The head 28 includes a slot 38 along its outer face 32 and above the shank 22 for inserting a screw driver (not shown) or any other object having a rigid flat narrow surface to facilitate the rotation of the drive pin 20. The slot 38 divides the head 28 into two portions which can have a similar surface area as shown in FIG. 1 or different surface areas as shown in FIG. 2. One skilled the art will appreciate that the slot 38 is not essential and that other means could be provided for allowing the drive pin 20 to be rotated.

A circular flange 40 is fixedly mounted around the shank 22, below the head 28. The flange 40 prevents the insertion of the drive pin 20 into a passageway, a hole or a wall since its diameter is wider than the one of the drive pin 20. The flange 40 is connected to the head 28 through three side connecting members 42 provided at a regular spacing around the semi-circular edge 36 of the head 28. The side connecting members 42 reinforce the connection between the head 28 and the flange 40, especially during the drive pin insertion and rotation. One skilled the art will appreciate that the drive pin 20 can be provided without the flange 40 and the connecting members 42. The insertion of the drive pin 20 can also be stopped by the head 28.

The leading end 26 of the shank 22 is wedge-shaped, creating two wedge-shaped faces 46. The wedge-shaped faces 46 facilitate the insertion of drive pin 20 in a back clip 48 (FIG. 2) or in any other object or surface such as a wall by reducing the stresses applied thereon. The leading end 26 can also be provided with any other shape such as a conical, a round, or a rectangular shape.

A groove 50, or a female member, surrounds the shank 22, proximate to the leading end 26. When the drive pin 20 is inserted into an anchoring device such as a wall anchor 52 (FIG. 2) having fingers 54 (FIG. 2), the groove 50 maintains drive pin 20 in the anchoring device, even when pressure is applied, as it will be explained more in details later.

The drive pin 20 is preferably cast or extruded in one piece. However, it is understood that different pieces could be assembled by welding, with glue or by any other technique known to one skilled in the art. The drive pin 20 can be made of plastic, metal or any other material known to one skilled in the art.

Referring now to FIGS. 2 and 3, it will be seen that, for supporting an object such as a shelf (not shown) on a wall (not shown), a back clip assembly 47 including a back clip 48 and the drive pin 20 can be used. The back clip 48 has a rectangular body 56 with a wall anchor 52, or an insert, extending therefrom and a rod engaging hook 58 projecting in the opposite direction. The body 56 has a back face 60 abutting the wall once mounted thereon and a front face 62. The wall anchor 52 preferably extends from the upper portion of back face 60 while the lower portion of front face 62 leads to the engaging hook 58. The body 56 of the back clip is not limited to a rectangular shape and can have any desired shape.

The engaging hook 58 has an upward U-shaped face 66 ending with an upward edge 68. A shelf (not shown) to be mounted on the back clip 48 has a back rod 70 which is inserted into the U-shaped face 66 of the engaging hook 58. The upward edge 68 has a groove 72, preferably in the middle thereof, for insertion of a cross rod 76 (FIG. 6) of the shelf.

A reinforcing member 80 can surround the engaging hook 58, in the middle and below thereof, as shown in FIG. 2. The reinforcing member 80 connects the engaging hook 58 to the body 56 and reinforces the back clip 48 when heavy furniture is disposed on the shelf or heavy objects are mounted thereto.

The back clip 48 is mounted to the wall with the wall anchor 52, which cooperates with the drive pin 20. The wall anchor 52 includes a straight tubular section 84 and a finger section 86. A passageway 88 extends along the straight tubular section 84, midway thereof. The passageway 88 has an aperture 90 on the front face 62 of the body 56 and another aperture 92 at the junction of the tubular and finger sections 84, 86. The diameter of the passageway 88 allows the insertion of the drive pin 20 therein. The front face 62 preferably has a cavity 94 surrounding the aperture 90 for insertion of the flange 40 therein. The insertion of drive pin 20 in the passageway 88 stops when the flange 40 abuts the bottom of the cavity 94.

The finger section 86 includes two parallel and laterally expandable fingers 54. Both fingers 54 have a trailing end 98 and a leading end 100. The fingers 54 have an outer face 102 and an opposite inner face 104. The fingers 54 are connected to straight tubular section 84 with hinges 106 allowing an outward pivoting of the fingers 54. The trailing ends 98 of the fingers 54 have a protuberance 108, or a male member, on their inner face 104 to avoid the release of the drive pin 20 as it will be described more in details later. The straight tubular section 84 and the outer face 102 of the fingers 54 can be covered with scales 110. The scales 110 reinforce the anchoring of the wall anchor 52 into the wall.

As for drive pin 20, the back clip 48 is preferably cast or extruded in one piece. Alternatively, the different pieces can be assembled by welding, with glue or by any other technique known to one skilled in the art. The back clip 48 can be made of plastic, metal or any other material known to one skilled in the art.

For mounting the back clip 48 to a wall, a hole (not shown) is preferably first made into the wall. Thereafter, the wall anchor 52 of the back clip 48 is inserted therein. Then, the back rod 70 of the shelf is inserted into the engaging hook 58. To increase the anchoring strength of back clip 48 onto the wall and securing the back rod 70 into the engaging hook 58, a drive pin 20 is slid into the passageway 88. The drive pin 20 is preferably inserted in such a manner that the wedge-shaped faces 46 are parallel to the fingers 54. Referring now to FIGS. 4 and 5, there is shown that the fingers 54 pivot outwardly when the drive pin 20 is slid into the finger section 86. The wedge-shaped faces 46 first penetrate into the finger section 86, between the fingers 54, making easier the insertion and reducing the stresses thereon. The insertion of the drive pin 20 stops when the flange 40 abuts the bottom of the cavity 94 and the protuberances 108 are inserted into the groove 50 surrounding the shank 22. As mentioned above, the insertion of the protuberances 108 into the groove 50 in a male-female engagement prevents the drive pin 20 from being released from the wall anchor 52. The protuberances 108 are not compulsory since the provision of hinges 106 on the trailing end 98 of the fingers 54 typically creates narrow edges that can also be inserted into the groove 50 to prevent the drive pin 20 from being released from the wall anchor 52.

Referring now to FIGS. 6, 7, and 8, it will be seen that the head 28 of the drive pin 20 can be rotated for securing the back rod 70 into the engaging hook 58. The rotation of head 28 reduces the free spacing over the engaging hook 58 and prevents the back rod 70 from being released when stresses are applied on the shelf. The head 28 of the drive pin 20 allows several width of free spacing over the engaging hook 58. The position of the head 28 is adjusted depending on the position of the cross rods 76 of the shelf. Referring to FIG. 6, there is shown a first position wherein the free spacing over the engaging hook 58 is minimized. FIGS. 7 and 8 show a second and a third position of the head 28 providing respectively a maximum and a medium spacing over the engaging hook 58.

Figure 9:
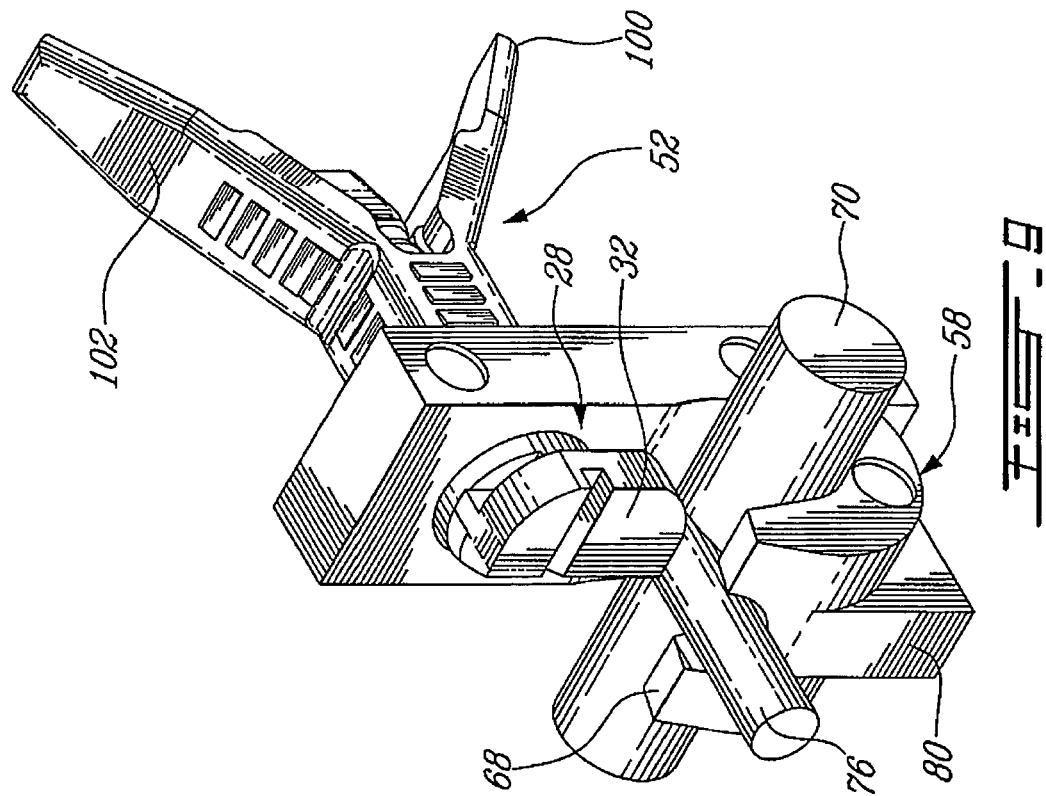
FIG. 9 is a perspective view of the back clip assembly of the embodiment shown on FIGS. 2-5, wherein a cross rod of a shelf abuts the back clip assembly and the head of the drive pin is in the first position.

Referring to FIG. 9, there is shown that it is impossible to turn the head 28 into its narrowest position, i.e. the first position shown on FIG. 6, when the cross rod 76 of the shelf is engaged into the groove 72. The head 28 interferes with the cross rod 76. Now referring to FIG. 10, it will be seen that the medium position, i.e. the third position shown on FIG. 8, is preferable. Even with the head 28 in the medium position, the free spacing over the engaging hook 58 is too small for release of the back rod 70.

Depending on the shape and the size of the head 28 and its position over the shank 22, different free spacings can be achieved over the engaging hook 58 or any other object mounted proximate. The free spacing over the engaging hook 58 can thus be adjusted by rotating the head 22 of the drive pin 20. For the shelf, the free spacing adjustment prevents the release of the back rod 70, even when there is interference between the back clip 48 and the cross rod 76.

Even if the drive pin has been described in combination with a back clip in, it is understood that it can be used with any wall anchor.

The insertion of the protuberance 108 into the groove 50 of the drive pin 20 when the latter is inserted into the passageway 88 of the wall anchor 52 prevents the drive pin 20 to be released from the passageway 88 even when stresses are applied on the wall anchor 82.

One skilled in the art will appreciate that the drive pin 20 can include none or more than one groove. A drive pin having more than one groove can have more than one insertion depth into the passageway of the wall anchor 52 and still be firmly maintained therein even if stresses are applied thereon.

One skilled in the art will appreciate that the invention is not limited to back clip assemblies as described in the embodiment hereinabove. It can also applied to wall anchor assemblies including a body section abutting a surface, a wall anchor extending from the body section and being adapted to be inserted into the surface, a passageway extending between the body section and the wall anchor, and a drive pin adapted to be inserted into the passageway.

The wall anchor assemblies can be adapted to support any object and does not necessarily include the engaging hook.

The back clip assembly and the wall anchor assembly are easy and fast to mount on a surface.

The length of the different parts of the back clip and the wall anchor assemblies can vary in accordance with the user's needs. For example, the length of the wall anchor and the drive pin can vary in accordance with the thickness of the wall where they are inserted.

The embodiments of the invention described above are intended to be exemplary only. For example, the support member such as the engaging hook can have any shape or be positioned above the wall anchor. The scope of the invention is therefore intended to be limited solely by the scope of the appended claims.

What is claimed is:

1. A shelf support assembly comprising:
   a back clip having a body with a back face and a front face, an upper portion and a lower portion, a wall anchor extending from the back face, in the upper portion, and a shelf-receiving hook extending from the front face, in the lower portion, and a passageway traversing the body and the wall anchor; and
   a drive pin having a shank for insertion into the passageway, and a head having an off-centered portion relative to the shank, the drive pin being rotatable in the passageway for rotating the off-centered portion from a shelf-engagement orientation, away from the hook, to a shelf-locking orientation, towards the hook, when a portion of the shelf is engaged in the hook.

2. The shelf support of claim 1 wherein the head has at least two off-centered portions at respective angular positions, each off-centered portion being provided at a different radial distance from the rotation axis of the shank.

3. The shelf support of claim 2 wherein the head has at least three off-centered portions each provided at a successively greater radial distance in angular succession.

4. The shelf support assembly of claim 1 wherein the hook is U-shaped and the portion of the shelf is a tubular back rod shaped to fit in the hook.

5. The shelf support assembly of claim 1 wherein the wall anchor has two opposed fingers, each on an opposite side of the passageway, the fingers being outwardly pivotable by the shank upon insertion of the shank in the passageway.

* * * * *